(12) United States Patent
Vig et al.

(10) Patent No.: US 11,726,999 B1
(45) Date of Patent: Aug. 15, 2023

(54) OBTAINING INFERENCES TO PERFORM ACCESS REQUESTS AT A NON-RELATIONAL DATABASE SYSTEM

(71) Applicant: Amazon Technologies, Inc., Seattle, WA (US)

(72) Inventors: Akshat Vig, Seattle, WA (US); Amit Gupta, Redmond, WA (US); Palak Agrawal, Cupertino, CA (US); Amit Purohit, Issaquah, WA (US); Benjamin Donald Wood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 17/347,420

(22) Filed: Jun. 14, 2021

(51) Int. Cl.
*G06F 16/2453* (2019.01)
*G06F 16/2455* (2019.01)
*G06F 16/25* (2019.01)
*G06N 5/04* (2023.01)
*G06N 20/00* (2019.01)

(52) U.S. Cl.
CPC .... *G06F 16/24542* (2019.01); *G06F 16/2455* (2019.01); *G06F 16/258* (2019.01); *G06N 5/04* (2013.01); *G06N 20/00* (2019.01)

(58) Field of Classification Search
CPC ........... G06F 16/24542; G06F 16/2455; G06F 16/258; G06N 5/04; G06N 20/00
See application file for complete search history.

(56) References Cited

U.S. PATENT DOCUMENTS

| | | | |
|---|---|---|---|
| 7,627,564 B2 | 12/2009 | Yao et al. | |
| 10,796,238 B2 * | 10/2020 | Chawla | G06N 3/006 |
| 2019/0179940 A1 * | 6/2019 | Ross | G06F 16/953 |
| 2019/0384863 A1 * | 12/2019 | Sirin | G06V 10/776 |
| 2020/0019546 A1 | 1/2020 | Luo et al. | |
| 2020/0219015 A1 * | 7/2020 | Lee | G06F 18/214 |
| 2021/0092069 A1 * | 3/2021 | Musleh | H04L 45/08 |
| 2021/0124739 A1 * | 4/2021 | Karanasos | G06F 16/284 |
| 2022/0083548 A1 * | 3/2022 | Thiyagarajan | G06N 20/00 |

* cited by examiner

*Primary Examiner* — Dangelino N Gortayo
(74) *Attorney, Agent, or Firm* — S. Scott Foster; Kowert, Hood, Munyon, Rankin & Goetzel, P.C.

(57) ABSTRACT

Inferences may be obtained to handle access requests at a non-relational database system. An access request may be received at a non-relational database system. The non-relational database system may determine that the access request uses a machine learning model to complete the access request. The non-relational database system may cause an inference to be generated using data items for the access request as input to the machine learning model. The access request may be completed using the generated inference.

20 Claims, 13 Drawing Sheets

US 11,726,999 B1

OBTAINING INFERENCES TO PERFORM ACCESS REQUESTS AT A NON-RELATIONAL DATABASE SYSTEM

BACKGROUND

Non-relational databases offer flexible, high-performance storage solutions for data utilized by many different types of applications. Because data in non-relational databases can be stored without adhering to a pre-defined data schema, data can be easily maintained in a non-relational database for applications where the information collected for different objects is variable (e.g., a user record that has multiple profiles or a user record that has only one profile). However, access to non-relational database systems typically utilizes proprietary protocols or languages that invoke system-specific Application Programming Interfaces (APIs), which may have startup costs for developers to become adept at using the non-relational database.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement obtaining inferences to perform access requests at a non-relational database system. With the explosion of data-driven analytics, leveraging machine learning techniques on real-time data is more time critical than ever before. In order to use machine learning with data stored in a non-relational database, a custom application to read from the non-relational database and then apply the machine learning model to the data. Moreover, this new application now requires developers to manage the application's performance, availability, and security; all of which averts developers' focus from their core product. The integration of a non-relational database system with machine learning techniques allows client applications of database systems to be focused on core functionality, while the data processing and management capabilities of a non-relational database system can be leveraged to interact with machine learning techniques, and reduce overhead for maintenance of data inference applications.

In various embodiments, obtaining inferences to perform access requests at a non-relational database system may allow client applications to make predictions using inferences from a machine learning model on client application data stored in in the non-relational database system. For example, a client application can submit a query to detect the sentiment of a user comment by applying a custom machine learning (ML) model.

Figure 1:
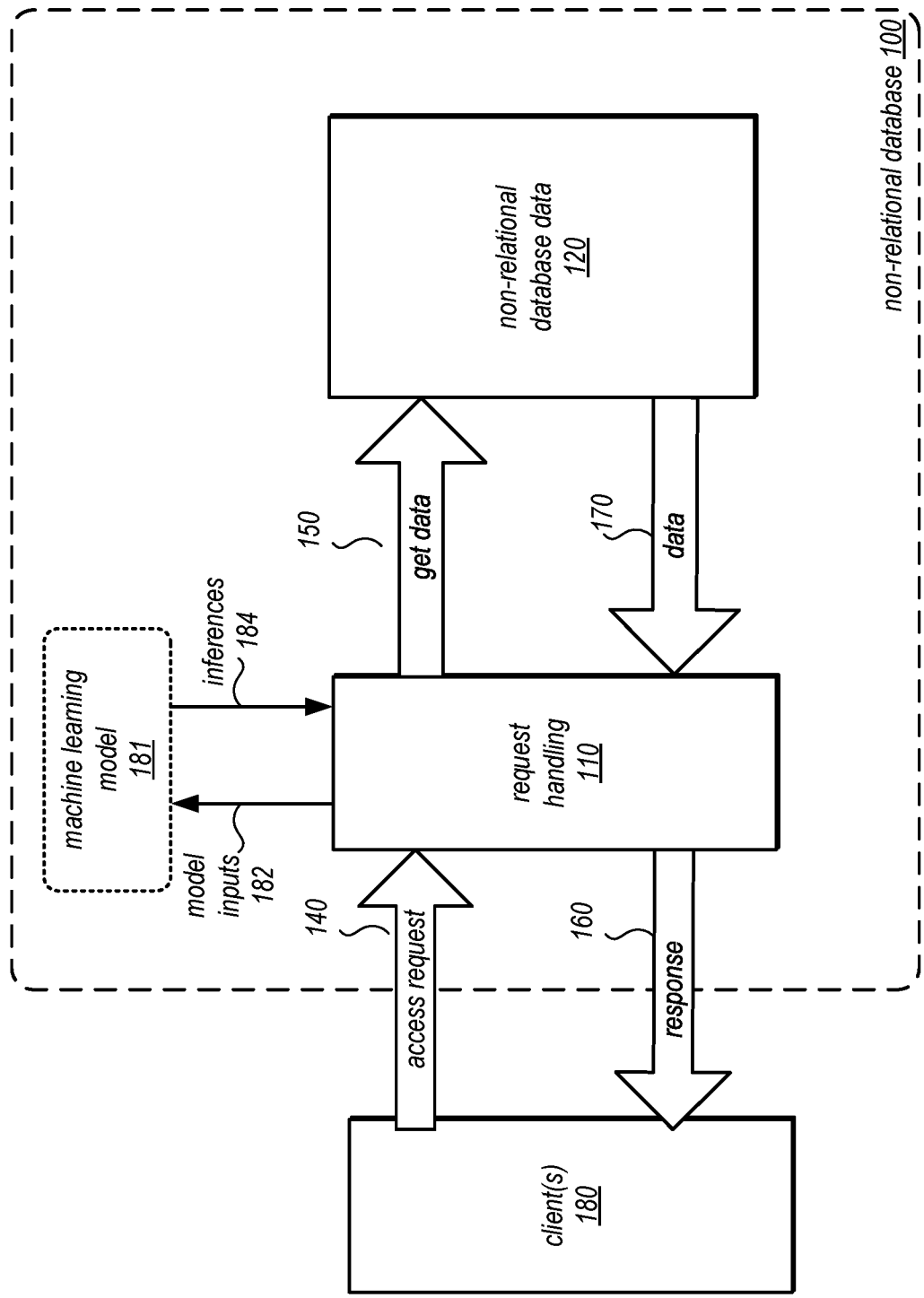
FIG. 1 is a logical block diagram illustrating obtaining inferences to perform access requests at a non-relational database system, according to some embodiments.

FIG. 1 is a logical block diagram illustrating obtaining inferences to perform access requests at a non-relational database system, according to some embodiments. Non-relational database 100 may be a network-based service (e.g., as discussed below with regard to FIG. 2) or a standalone server or application that stores and provides access to data in a non-relational manner. Various types of non-relational databases 100, storing various types of data may be implemented in different embodiments (e.g., NoSQL databases, document databases, key-value data stores, semi-structure or unstructured data stores, etc.). Access to non-relational database data 120 may be provided by different types of Application Programming Interface (APIs). For example, an API may be invoked to retrieve an item, or update the item, or add a new item.

Non-relational database 100 may implement request handling 110 to handle requests to access non-relational database data from clients 180. Clients 180 may be another application, system, or device that generates requests, such as query language request 140. Request handling 110 can perform or manage the performance of various requests, including access requests 140, as discussed according to the techniques below with regard to FIGS. 3-11. For example, when an access request 140 is received, request handling 110 may determine that a machine learning model 181 is associated with performing the access request, provide model inputs 182 (which may be data gotten from non-relational database data 120) to obtain an interface 184, perform operations to get data 150 from non-relational database data 120, and based on the returned data 170, return a response 160 (e.g., a result or acknowledgement). In this way, client (s) 180 can perform requests to take advantage of a machine learning model without having to separately access and manage the machine learning model.

Please note that previous descriptions of obtaining inferences to perform access requests at a non-relational database system, but are merely provided as logical examples.

This specification begins with a general description of a provider network that may implement a non-relational database service that may implement obtaining inferences to perform access requests at a non-relational database system. Then various examples of a non-relational database service are discussed, including different components/modules, or arrangements of components/module, that may be employed as part of implementing the database service, in one embodiment. A number of different methods and techniques to implement obtaining inferences to perform access requests at a non-relational database system are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
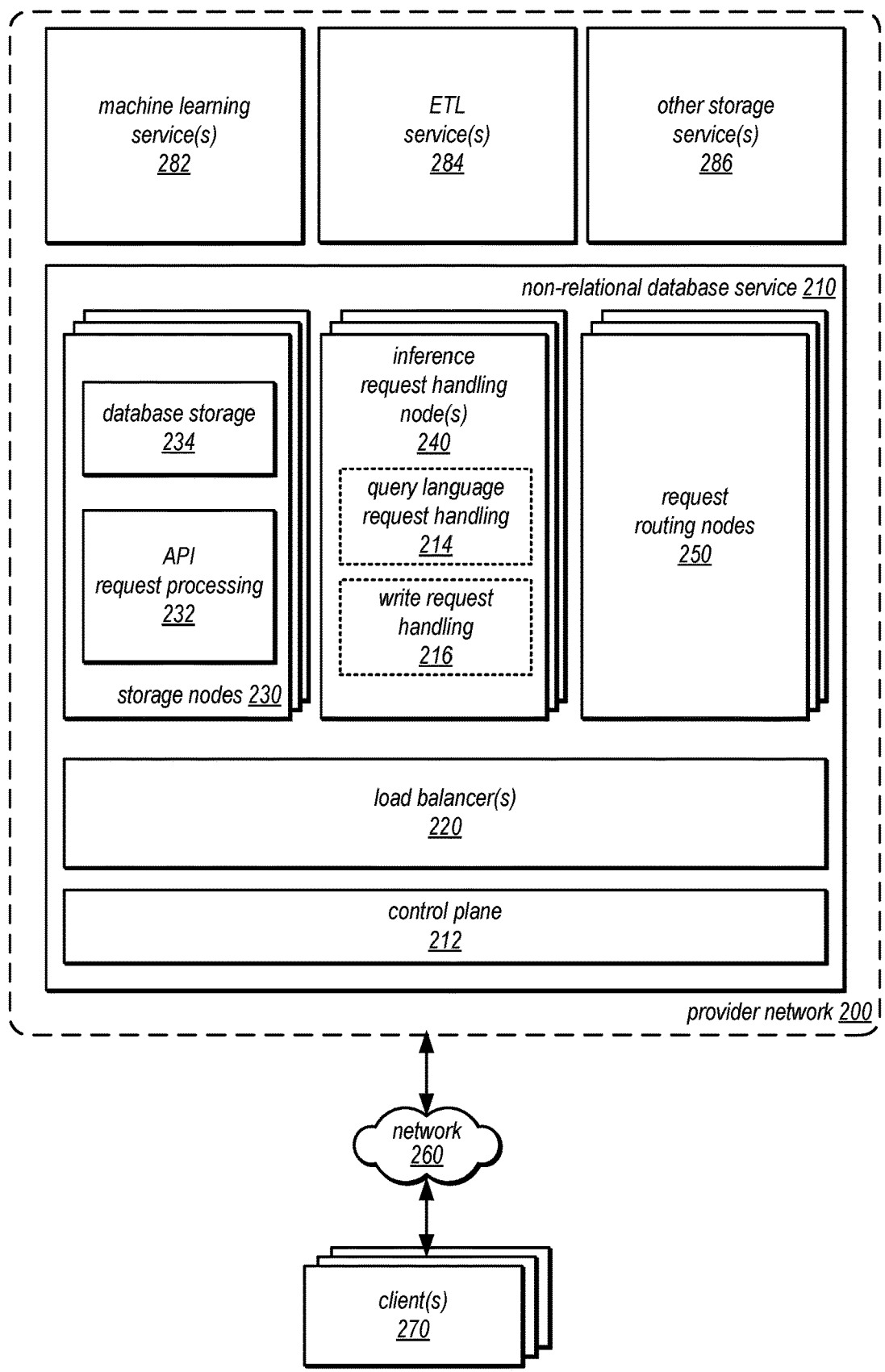
FIG. 2 is a logical block diagram illustrating a provider network that implements a non-relational database service that may implement obtaining inferences to perform access requests at a non-relational database system, according to some embodiments.

FIG. 2 is a logical block diagram illustrating a provider network that implements a non-relational database service that may implement obtaining inferences to perform access requests at a non-relational database system, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 270, in another embodiment. In one embodiment, provider network 200 may be implemented in a single location or may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and storage services offered by the provider network 200. In one embodiment, provider network 200 may implement various computing resources or services, such as non-relational database service(s) 210 (e.g., NoSQL databases, document databases, key-value stores, or other database services that do not require a pre-defined data model or structure (e.g. a relational structure) to be imposed upon data stored to perform queries or other access requests to the data), and other services (not illustrated), such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 12 and described below. In one embodiment, the functionality of a given system or service component (e.g., a component of non-relational database service 210) may be implemented by a particular node or may be distributed across several nodes. In some embodiments, a given node may implement the functionality of more than one service system component (e.g., more than one data store component).

Non-relational database service 210 may include various types of non-relational database services, in one embodiment, for storing, querying, and updating data. Such services may be enterprise-class database systems that are highly scalable and extensible. In one embodiment, queries may be directed to a database in non-relational database service 210 that is distributed across multiple physical resources, and the database system may be scaled up or down on an as needed basis. The database system may work effectively with database schemas of various types and/or organizations, in different embodiments. In one embodiment, non-relational database service 210 may provide a RESTful programmatic interface in order to submit access requests (e.g., to get, insert, delete, or query data).

In one embodiment, clients 270 may encompass any type of client configurable to submit network-based requests to provider network 200 via network 260, including requests for non-relational database service 210 (e.g., to perform an access request to a database hosted in non-relational database service 210 using a machine learning model). For example, in one embodiment a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in non-relational database service 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in one embodiment. In one embodiment, client 270 may generate network-based services requests according to a Representational State Transfer (REST)-style network-based services architecture, a document- or message-based network-based services architecture, or another suitable network-based services architecture. Note that in some embodiments, clients of database service(s) 210 may be implemented within provider network 200 (e.g., applications hosted on a virtual compute service).

In one embodiment, a client 270 may provide access to provider network 200 to other applications in a manner that is transparent to those applications. For example, client 270 may integrate with a database on non-relational database service 210. In such an embodiment, applications may not need to be modified to make use of the storage system service model. Instead, the details of interfacing to the non-relational database service 210 may be coordinated by client 270.

Client(s) 270 may convey network-based services requests to and receive responses from provider network 200 via network 260, in one embodiment. In one embodiment, network 260 may encompass any suitable combination of networking hardware and protocols necessary to establish network-based-based communications between clients 270 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in one embodiment, client(s) 270 may communicate with provider network 200 using a private network rather than the public Internet.

Non-relational database service 210 may implement request routing nodes 250, in one embodiment. Request routing nodes 250 may receive, authenticate, parse, throttle and/or dispatch service or other access requests, among other things, in one embodiment. For example, FIGS. 4-7, discuss various embodiments of implementing request routing nodes 250 to dispatch different types of requests. In one embodiment, request routing nodes 250 may support handling requests formatted according to an interface to support different types of web services requests. For example, in one embodiments, non-relational database service 210 may implement a particular web services application programming interface (API) that supports a variety of operations on tables (or other collections of data objects) that are maintained and managed on behalf of clients/users by the non-relational database service (and/or data stored in those tables/collections). In one embodiment, non-relational database service 210 may support different types of services requests. For example, in one embodiments, database service 210 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes. Similarly, a request may be a request to perform operations on individual items (e.g., requests to read, write, update, delete, add, or insert items in a table, according to a specified consistency level or characteristic). In one embodiment, request routing nodes 250 may perform parsing and/or throttling of service requests, authentication and/or metering of service requests, dispatching service requests, and/or maintaining partition assignments that map storage nodes to partitions of tables hosted in non-relational database service(s) 210.

In one embodiment, non-relational database service 210 may implement control plane 212 to implement one or more administrative components, such as automated admin instances which may provide a variety of visibility and/or control functions). Control plane 212 may provide visibility and control to system administrators, detect split events for partitions of tables at storage nodes, and/or anomaly control, resource allocation, in one embodiment. In one embodiment, control plane 212 may also include an admin console, through which system administrators may interact with database service 210 (and/or the underlying system). In one embodiment, the admin console may be the primary point of visibility and control for non-relational database service 210 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated. Control plane 212 may provide an interface or access to information stored about one or more detected control plane events, such as split requests to be processed, at non-relational database service 210, in one embodiment.

Control plane 212 may direct the performance of different types of control plane operations among the nodes, systems, or devices implementing database service 210, in one embodiment. For instance, control plane 212 may communicate with storage nodes to initiate the performance of various control plane operations, such as moves, splits, update tables, delete tables, create indexes, etc . . . . In one embodiment, control plane 212 may include a node recovery feature or component that handles failure events for storage nodes 230, query language query engine nodes 240, and request routing nodes 250 (e.g., adding new nodes, removing failing or underperforming nodes, deactivating or decommissioning underutilized nodes, etc).

In various embodiments, non-relational database service 210 may implement one or more load balancers 220 to direct requests to the appropriate components and distribute load. For example, load balancers may balance requests among request routing nodes (and/or query language query engine node(s) 240).

In one embodiment, non-relational database service 210 may also implement a plurality of storage nodes 230, each of which may manage one or more partitions of a database table (or other collection of data items) on behalf of clients/users or on behalf of non-relational database service 210 which may be stored in database storage 234 (on storage devices attached to storage nodes 230 or in network storage accessible to storage nodes 230).

In one embodiment, non-relational database service 210 may implement a separate fleet or service of inference request handling nodes, which may implement query language request handling 214 and write request handling 216, as discussed in detail below with regard to FIGS. 3-10. In other embodiments, non-relational database service 210 may implement inference request handling as part of request routing nodes 250 (e.g., implementing query language request handling 214 and/or write request handling 216).

Storage nodes 230 may implement API request processing 232, in one embodiment. API request processing 232 may create, update, define, query, and/or otherwise administer databases, in one embodiment. In one embodiment, API request processing 232 may handle requests to access the data (e.g., to perform transactions, to insert, modify, add, or delete data, and requests to query for data by generating query execution plans to determine which partitions of a database may need to be evaluated or searched in order to service the query). In one embodiment, API request processing 232 may also perform other management functions, such as enforcing access controls or permissions, concurrency control, or recovery operations.

In one embodiment, non-relational database service 210 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more storage nodes 230 process access requests on behalf of clients directed to tables. Some of these processing nodes may operate as if they were in a multi-tenant environment, and others may operate as if they were in a single-tenant environment. In some embodiments, storage nodes 230 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the non-relational database service 210. Moreover, different replica groups may utilize overlapping nodes, where a storage node 230 may be a member of multiple replica groups, maintaining replicas for each of those groups whose other storage node 230 members differ from the other replica groups.

In some embodiments, non-relational database service 210 may implement a non-relational data model may include tables (or alternatively collections) containing items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key, in some embodiments. Data in items may be nested, in some embodiments, such that an attribute that has a sub attribute which has a sub-sub attribute, etc.

Non-relational database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by non-relational database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by non-relational database service 210 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation (JSON) or ION), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Non-relational database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, non-relational database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Provider network 200 may implement machine learning services 282, which may apply machine learning models to generate inferences and/or train machine learning models for deployment, in some embodiments. Provider network 200 may implement ETL services 284, which may perform extract, load, and transform operations upon identified data sets. Other storage services 286 in provider network 200 may be an object store or other type of data store for storing data.

Figure 3:
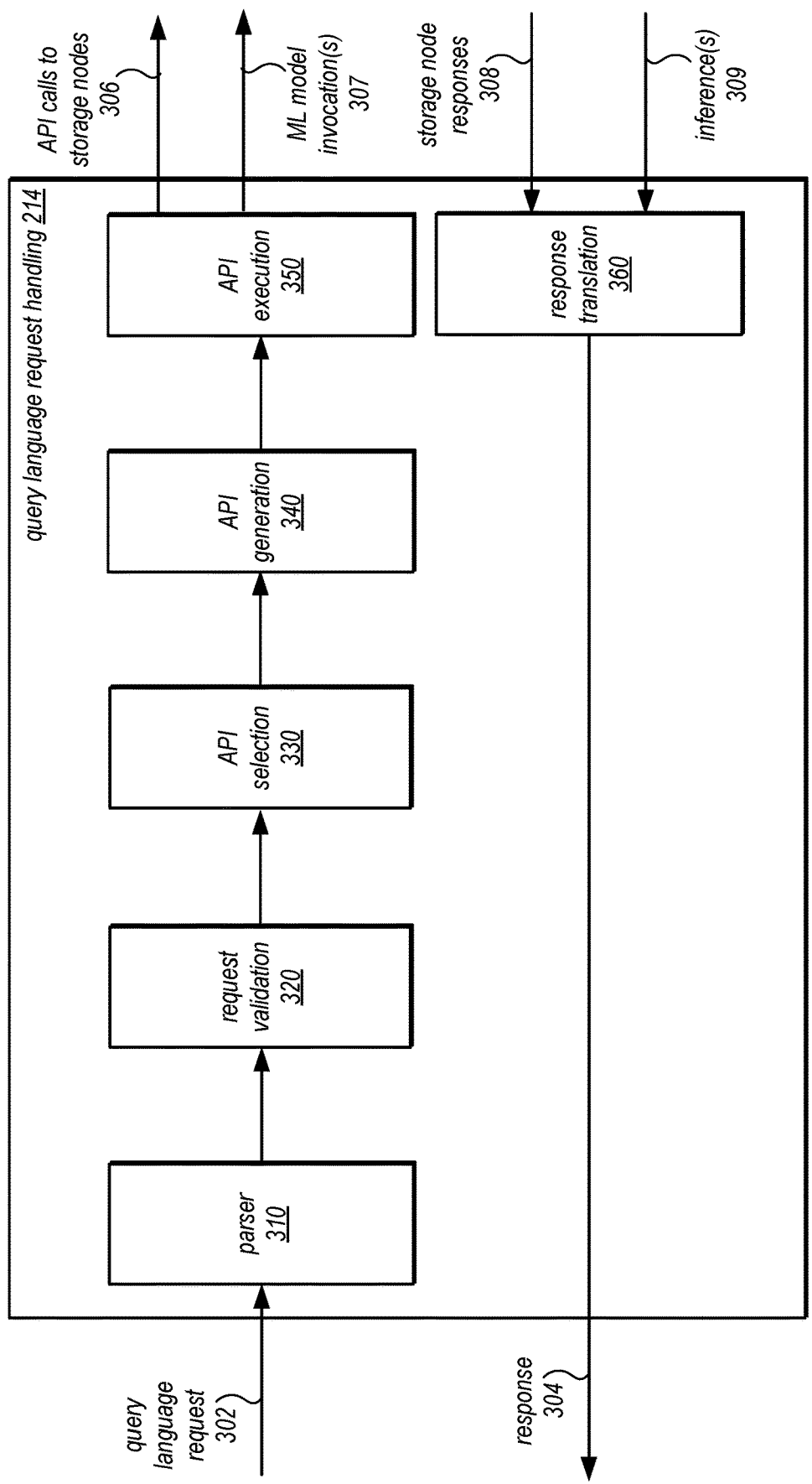
FIG. 3 is a logical block diagram illustrating query language request handling for a non-relational database that obtains inferences to perform access requests at a non-relational database system, according to some embodiments.

FIG. 3 is a logical block diagram illustrating query language request handling for a non-relational database that obtains inferences to perform access requests at a non-relational database system, according to some embodiments. Query request handling 214 may implement parser 310 to parse a received query language request 302. For example, parser 310 may identify or recognize keywords, parameters, or other delimiters for the query language. In some embodiments, parser 310 may be invoked or implemented as a library for the query language that may be received, such as SQL parsing library or other query language such as PartiQL (which may extend and/or be compatible with the SQL) which may provide the information to parse query language request 302. Parser 310 may generate a symbol tree and/or parse graph which may be provided to request validation.

Request validation 320 may examine the specified commands, parameters, and operators to determine whether the request 302 is valid. For example, specified commands may be compared with a white list of supported commands. In some embodiments, request validation 320 may examine parameters for validity. For example, the data types of specified parameters may be evaluated for supported data types in the non-relational database service. Request validation 320 may also validate the content of some parameters, such as whether or not a specified table or data set exists. Invalid requests may be rejected with a response that indicates the command is not supported (not illustrated).

API selection 330 may receive the command(s) and valid parameter(s) for selecting an API. API selection 330 may implement various techniques 9. For example, API selection may maintain a mapping or other classification scheme for commands. Each command classification may include one or more possible APIs which may be invoked to provide a result consistent with the command. For instance classifications may be divided into data definition language (DDL) requests and data manipulation language (DML). These classifications may be further broken down into requests (e.g., DDL into create table or drop table and DML into select, update, insert, and delete). Each command may be further broken down into groups of possible requests. For example, select may be mapped to possible get, query, and scan APIs. In some embodiments, the performance costs of each API in a classification may be ranked or compared so that API selection 330 may make an optimal selection of the most performant API. Such a selection may be conditioned on whether the appropriate parameters for the different types of requests are specified in the query language request. In at least some embodiments, API selection may recognizing invocations of or references to machine learning model(s), which may indicate that inferences may be generated by those machine learning model(s) in order to perform the query language request.

In some embodiments, different copies of a database, such as a secondary index, view, or other copy of data may be used, and thus API(s) may be selected to be directed to those alternative copies, which may provide more performant access to the requested data in some scenarios. For example, a secondary index may be a subset or selection of data from one or more base tables in the non-relational database that is organized or indexed differently (e.g., by a different primary key), which may improve the performance for certain data when performing, for example, a select).

API generation 340 may generate the selected API(s) to perform query language request 302. For example, API generation 340 may construct or specify a message, instruction, or other request to make the appropriate API calls. In some embodiments, API generation 340 may convert or change data types of parameters from query language specified data types to a corresponding data type supported by non-relational database service 210. For example, a "blob" data type in the query language request may be changed to a "binary" data type. In some instances, changing the data type may include reformatting (as opposed to just changing the data type designation) the data (e.g., removing trailing zeros, representing NULL differently, etc.). In some embodiments, an intermediate format or other representation of data in an originally specified data type may be used to determine which data type to use in the translated API. For example, a "Date" data type may be stored in a binary format, literal (e.g., character literals) format, or other representation in order to apply one or more translation rules to detect the characteristics of a "Date" and select a "String" translation data type. Some changes of data type may result in data loss and thus could trigger a failure or validation error similar to request validation 320, resulting in the request not being performed, in some embodiments. API execution 350 may then send the generated API calls to the appropriate storage nodes 306. API execution 350 may also the appropriate ML model invocations 307 as determined from the query 302

Query language request handling 214 may also implement response translation 360. Response translation may receive various storage node response(s) 308 for the API(s) of query language request 302. In those scenarios where the response is expected in a particular format, response translation 360 may perform the data format change (e.g., from a JSON format to an ION format). In some embodiments, data type conversions may be reversed to return data types specified differently for the API calls to be reverted back in a result or response to the expected data type. Response translation 260 may also handle or otherwise incorporate inference(s) 309 as part generating response 304.

Figure 4A:
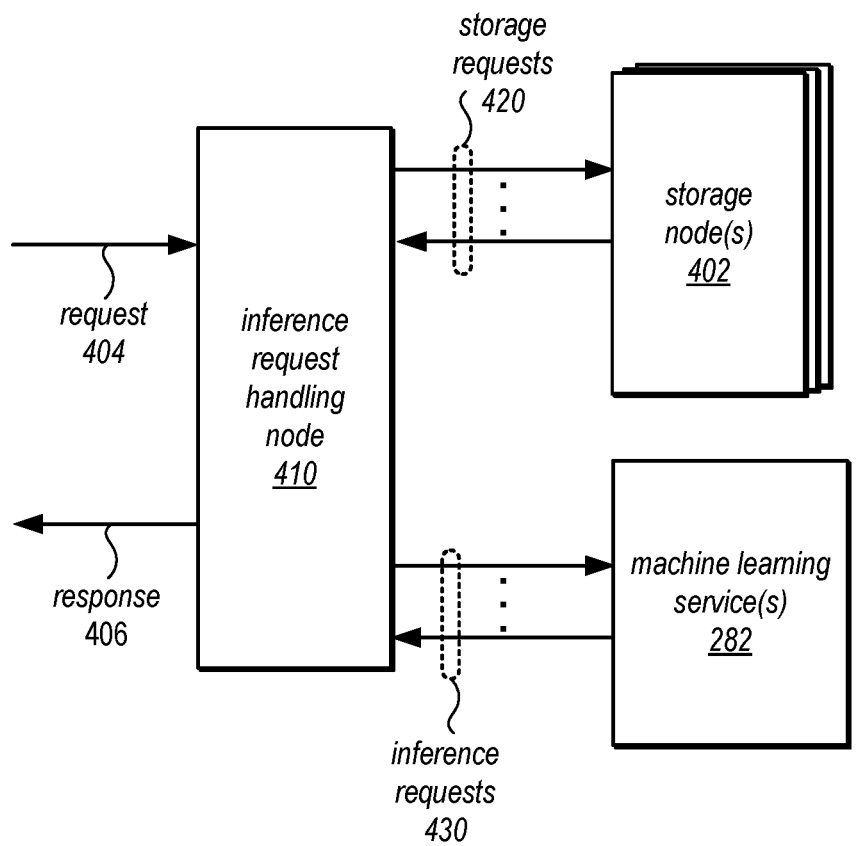
FIGS. 4A-4B are logical block diagrams illustrating local and remote inference generation, according to some embodiments.
Figure 4B:
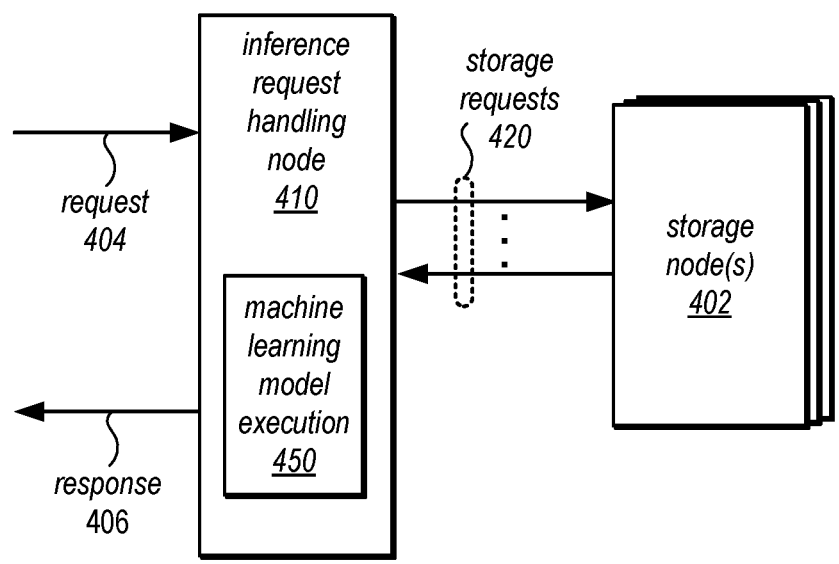

FIG. 4A are logical block diagrams illustrating local and remote inference generation, according to some embodiments. In FIG. 4A, inference request handling node 410 may receive an access request 404. Inference request handling node may perform various storage requests 420 to storage nodes. Inference request handling node 410 may also perform various inference requests 430 (e.g., via API calls or other interfaces) to one (or more) machine learning service (s) 282, which may return inferences for use in generating a response. In FIG. 4B, inference request handling node 410 may perform local inference generation, as a machine learning model may be executed at inference request handling node 410, as indicated at 450. In such embodiments, inference request handling node may be a single tenant node (whereas in FIG. 4A it maybe a multi-tenant node). If a single tenant node, inference request handling node 410 may be assigned and the network endpoint or address provided to a client for performing requests.

Figure 5A:
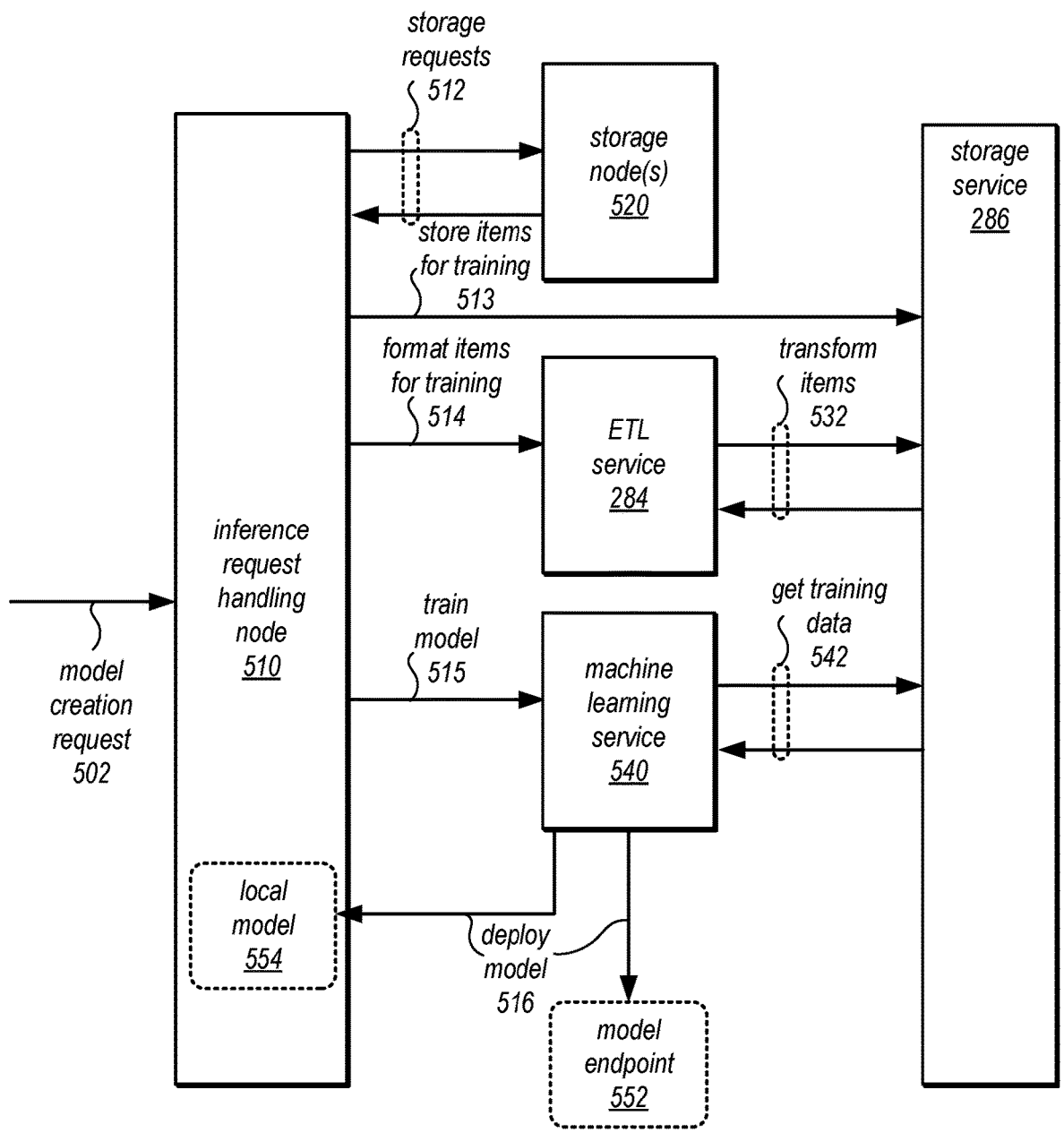
FIGS. 5A and 5B are logical block diagrams illustrating handling model creation requests, according to some embodiments.

FIG. 5A is a logical block diagram illustrating handling model creation requests that utilizes a separate storage service, according to some embodiments. Inference request handling node 501 may receive a model creation request, as discussed below with regard to FIG. 11. Inference request handling node may initiate storage requests 512 to storage node(s) 520 to obtain items for training. Inference request handling node may then store the items for training as indicated at 513 in storage service 286.

Node 510 may request ETL service 284 to format the items for training, as indicated at 514. EL service 284 may access the items and transform them in storage service 286. Node 510 may then request machine learning service 540, which may support training features and techniques to train a model, as indicated at 515, using the training data. Machine learning service 540 may obtain the training data, as indicated at 542 and provide a trained model for deployment 516, to be a local model 554 or remotely hosted at model endpoint 552.

Figure 5B:
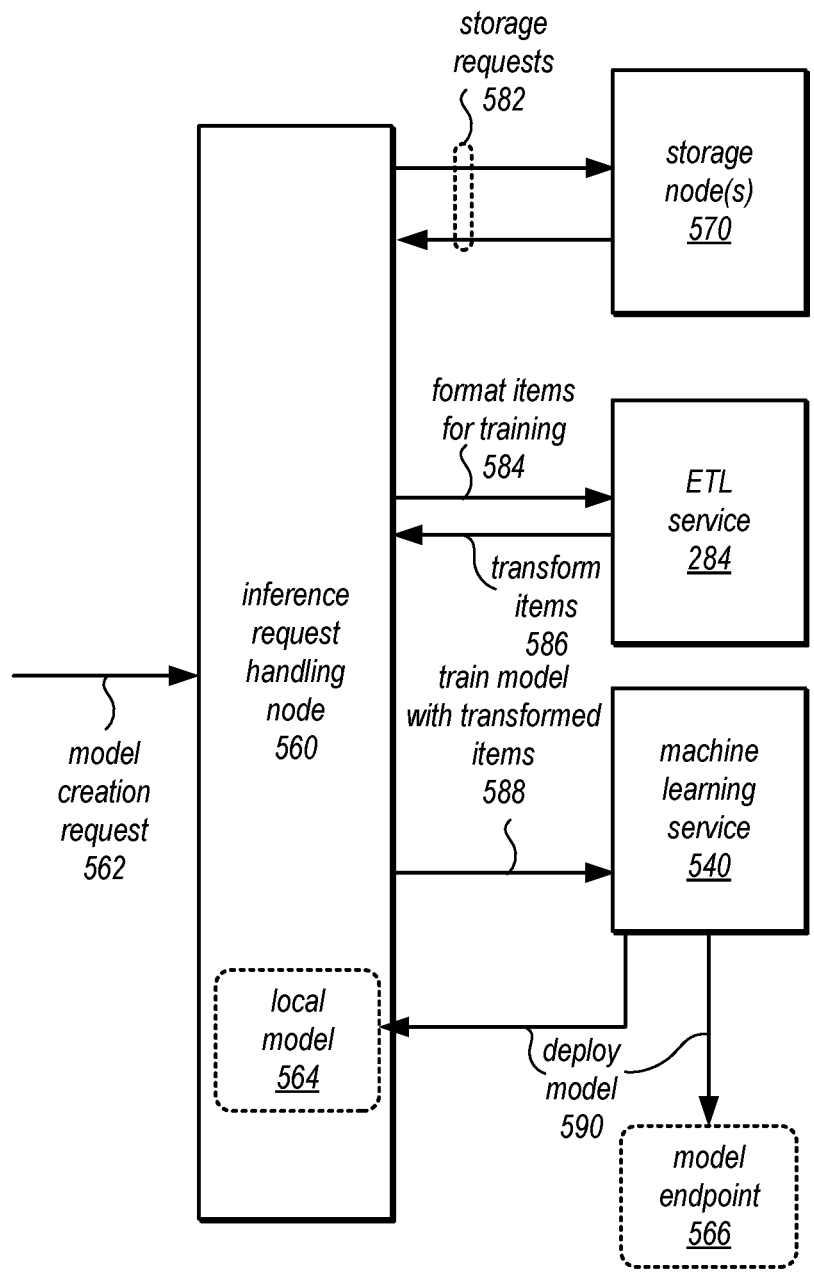

FIG. 5B is a logical block diagram illustrating handling model creation requests that utilizes batch training of a machine learning service, according to some embodiments. Inference request handling node 560 may receive a model creation request, as discussed below with regard to FIG. 11. Inference request handling node 560 may request ETL service 284 to format the items obtained from storage requests 582 for training, as indicated at 584. EL service 284 may receive the items, transform them, and return then to inference request handling node 560. Inference request handling node 560 may then utilize a batch model creation interface of machine learning service 540, which may support training features and techniques to train a model with the provided transformed items, as indicated at 588. Machine learning service 540 may train the model and provide the trained model for deployment 590, to be a local model 564 or remotely hosted at model endpoint 566.

Figure 6:
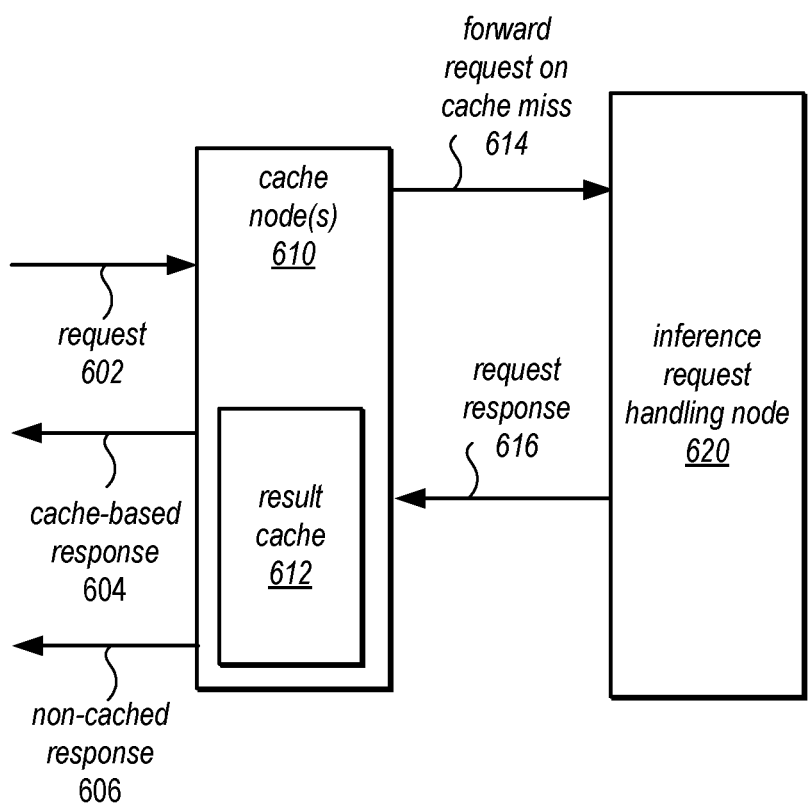
FIG. 6 is a logical block diagram illustrating result caching for a non-relational database system, according to some embodiments.

FIG. 6 is a logical block diagram illustrating result caching for a non-relational database system, according to some embodiments. A result cache 612 may be used, in some embodiments, which may include caching inferences generated for access requests. In this way, the result cache may provide fast performance of machine learning informed queries to clients, without having to generate a new inference. For example, a request 602 may be received at cache nodes 610. If the result cache cannot serve the request then the request may be forwarded as indicated at 614. A response from the inference request handling node 620 may then be used to update result cache 612 and provide a non-cached response 606. If a cached response can be provided, as indicated at 604, then no request would have to be made to inference request handling node 620.

Figure 7:
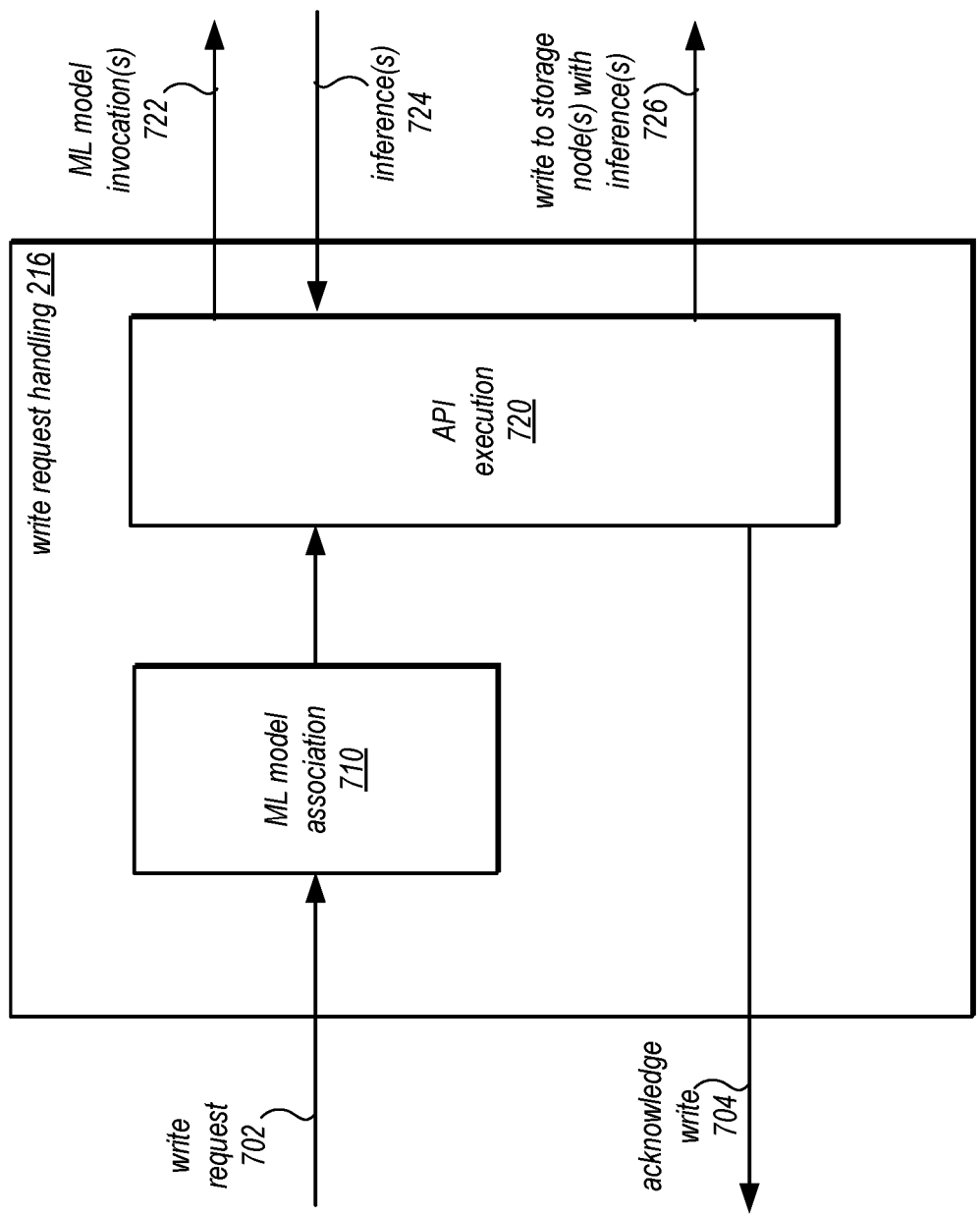
FIG. 7 is a logical block diagram illustrating writes that generate inferences included in a database replication stream, according to some embodiments.

FIG. 7 is a logical block diagram illustrating writes that generate inferences included in a database replication stream, according to some embodiments. Write request handling 216 may accept a write request 702. For example, the write request may be specified according to a write API (e.g., an request to PUT an item in a table) or a query language (e.g., a SQL-like statement to "INSERT item INTO table". In some embodiments, the write request 702 may specify a machine learning model (e.g., as a parameter, field, key word, or other indicator in write request 702). In some embodiments, no machine learning model may be specified in write request 702.

ML model association 710 may access, manage, or otherwise obtain metadata that describes tables, which may include an identifier for a machine learning model for a table, in some embodiments. In this way, even if write request 702 does not specify or include an indicator of a machine learning model, ML model association 710 may determine which machine learning model should be used based on the metadata. As indicated at API execution 720, may perform API calls to invoke the associated machine learning model 722, obtain the resulting inferences 724, and then perform a write to storage with inferences 726. For example, the inference value may be stored along with other fields, values, or attributes of an item. In some embodiments, the inference value may be used to determine what value to store but may not itself be stored with the item, in some embodiments. An acknowledgment 704 may then be returned.

The examples of a database service that implements handling access requests that use machine learning models as discussed in FIGS. 2-7 above have been given in regard to a non-relational database service (e.g., a NoSQL database service, document database, a key-value store, etc.). However, various other types of non-relational database systems may obtain inferences to perform access requests at a non-relational database system, in other embodiments.

Figure 8:
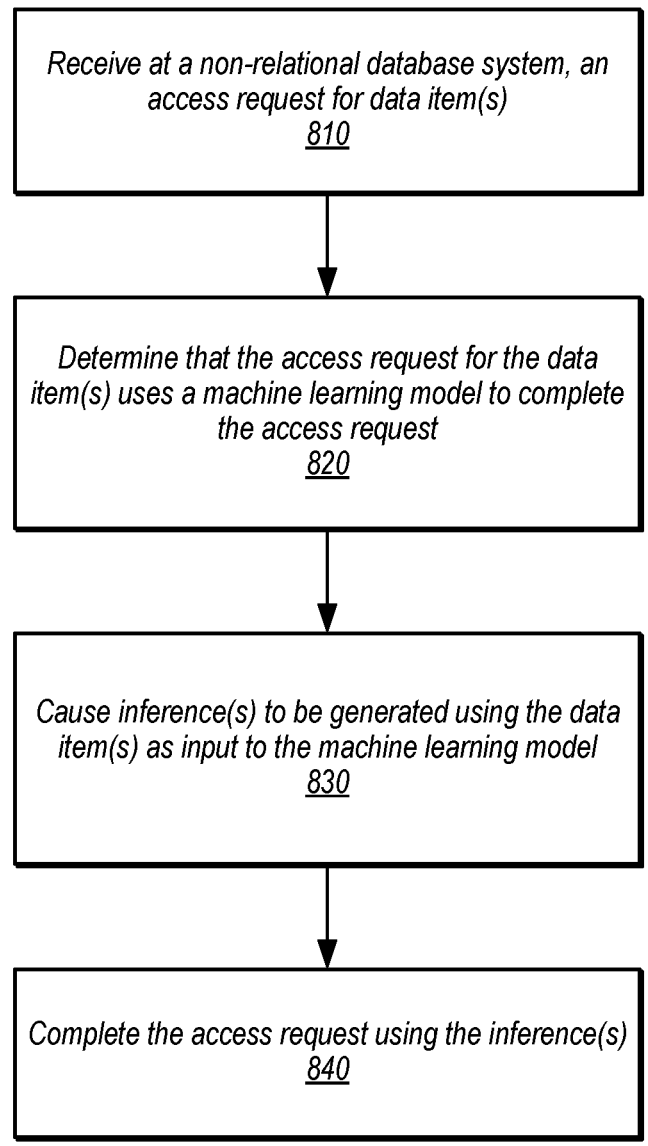
FIG. 8 is a high-level flowchart illustrating various methods and techniques to implement obtaining inferences to perform access requests at a non-relational database system, according to some embodiments.

FIG. 8 is a high-level flowchart illustrating various methods and techniques to implement obtaining inferences to perform access requests at a non-relational database system, according to some embodiments. These techniques, as well as the techniques discussed with regard to FIGS. 9-11, may be implemented using components or systems as described above with regard to FIGS. 2-7, as well as other types of databases, query engines, or systems, and thus the following discussion is not intended to be limiting as to the other types of systems that may implement the described techniques.

As indicated at 810, an access request for data item(s) may be received at a non-relational database system, in various embodiments. The request may be received via a network interface for a non-relational database system. In some embodiments, the request may be formatted according to a protocol specified by a driver or connection component implemented at a client application that can format and send the request to the non-relational database service. In some embodiments, the request may be formatted according to an API for submitting requests in a query language (e.g., "ExecuteQueryLanguageStatement"). Different access requests may be received, such as access requests that are queries, as discussed in detail below with regard to FIG. 9 or writes, as discussed in detail below with regard to FIG. 10.

In some embodiments, the request may be formatted according to an API (e.g., a request to put, set, or otherwise write data items). In some embodiments, the request may be specified in a query language compatible with both a non-relational data model and a relational data model, in some embodiments. For example, SQL or other query languages that presume a structure, such as a pre-defined data schema for the data stored in the database (e.g., a number of columns with specified data types). In some embodiments, the query language may also support operations over data that is not structured, and thus stored without being stored in a pre-defined data format. For example, a query language may be SQL-compatible but also accept as parameters or inputs for operations over semi-structured data, nested data, and schema-less data, in addition to data stored a relational data format.

As indicated at 820, a determination may be made that the access request for the data item uses a machine learning model complete the access request, in some embodiments. For example, the machine learning model (or an inference generated by the machine learning model) may be referenced or otherwise specified in the access request. An evaluation of the access request may identify the machine learning model (or inference) as specified by the access request. In some embodiments, the target of the access request, such as a data set of items (e.g., a table, collection, or other grouping of data items) may be associated with the machine learning model. Metadata or other information descriptive of and used to handle requests to the data set may be accessed when the access request is received in order to identify the association of the machine learning model, which data item(s) may be included in or to be included in.

As indicated at 830, one (or more) inferences may be generated using the data item(s) as input to the machine learning model, in some embodiments. For example, if the items are obtained for a query or other search, one or more attribute values of the data item(s) may be input features used to generate corresponding inferences for each data item. As discussed above, local implemented models or remote systems or services implementing the models may be caused to generate the inference(s). As indicated at 840, the access request may be completed using the inference(s), in some embodiments. For example, for writes, the inferences may be included or stored in order to complete the data item being inserted into or updated in the non-relational database system. Alternatively, the inferences may be returned in a response to the access request (e.g., in a result for a query).

Figure 9:
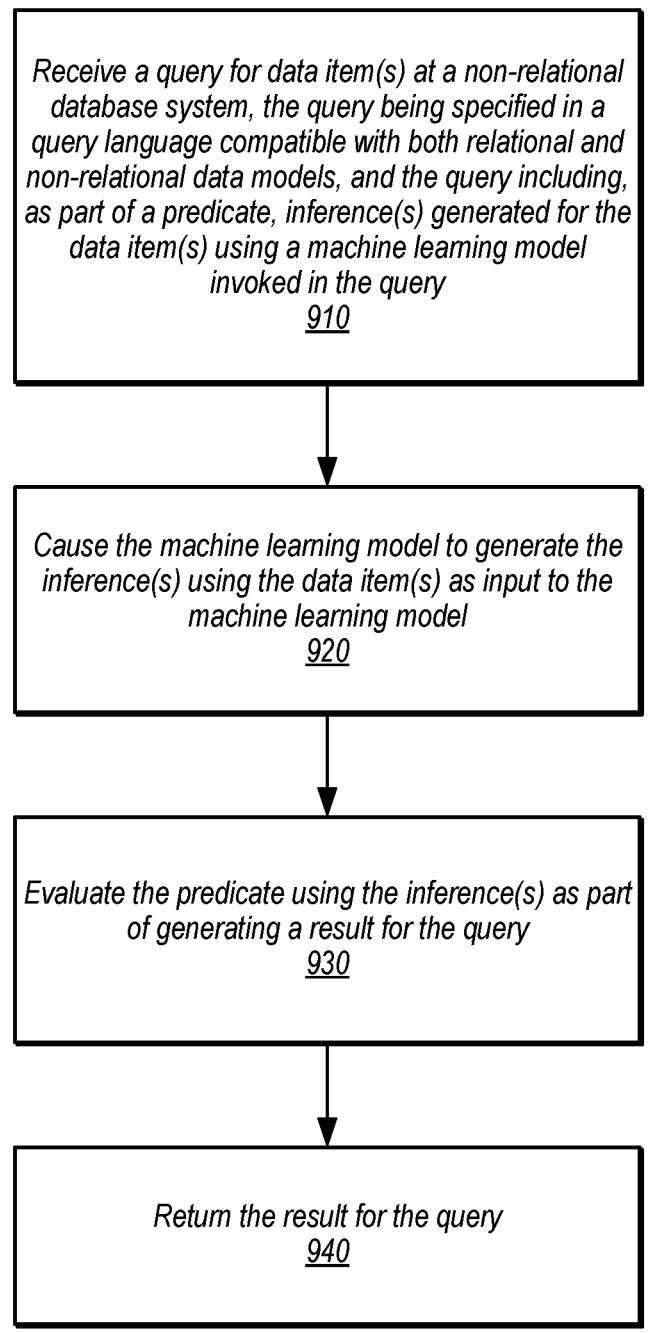
FIG. 9 is a high-level flowchart illustrating various methods and techniques to handle a query at a non-relational database system that uses an inference generated from a machine learning model, according to some embodiments.

As discussed above, a query may be one example of an access request. FIG. 9 is a high-level flowchart illustrating various methods and techniques to handle a query at a non-relational database system that uses an inference generated from a machine learning model, according to some embodiments. As indicated at 910, a query for data item(s) may be received at a anon-relational database system. In some embodiments, the query may be specified in a query language with compatible with both relational and non-relational data models. In some embodiments, the query may include inference(s) generated for the data item(s) as part of a predicate of the query. In some embodiments, the query may name, reference, or otherwise invoke the machine learning model.

An example query is provided below:
SELECT customerId, review, ML_model_detect_sentiment('en', review)
AS sentiment
FROM Customer Reviews
WHERE sentiment='NEGATIVE'

In another example query, a separately hosted or implemented machine learning model may be identified in the query:
SELECT customerId, ML_model_endpoint_rcf('Credit-Fraud-Endpoint', f1, f2)
AS confidence
FROM Customers
WHERE confidence>1.0

As indicated at 920, the non-relational database system may cause the machine learning model to generate the inference(s) using the data item(s) as input to the machine learning model. For instance, attributes selected from data items may be used as input features. These attributes may be first obtained (e.g., from storage nodes) and then applied at a local machine learning model or sent as part of a request to separate machine learning system or service that implements the machine learning model.

As indicated at 930, the predicate may be evaluated using the inference(s) as part of generating a result for the query, in some embodiments. For example, as indicated in the example query above, "confidence" may be the inference returned from the "ML_model_endpoint_rcf" and may be evaluated and returned if "confidence>1.0." A result of the query may then be returned, as indicated at 940.

Figure 10:
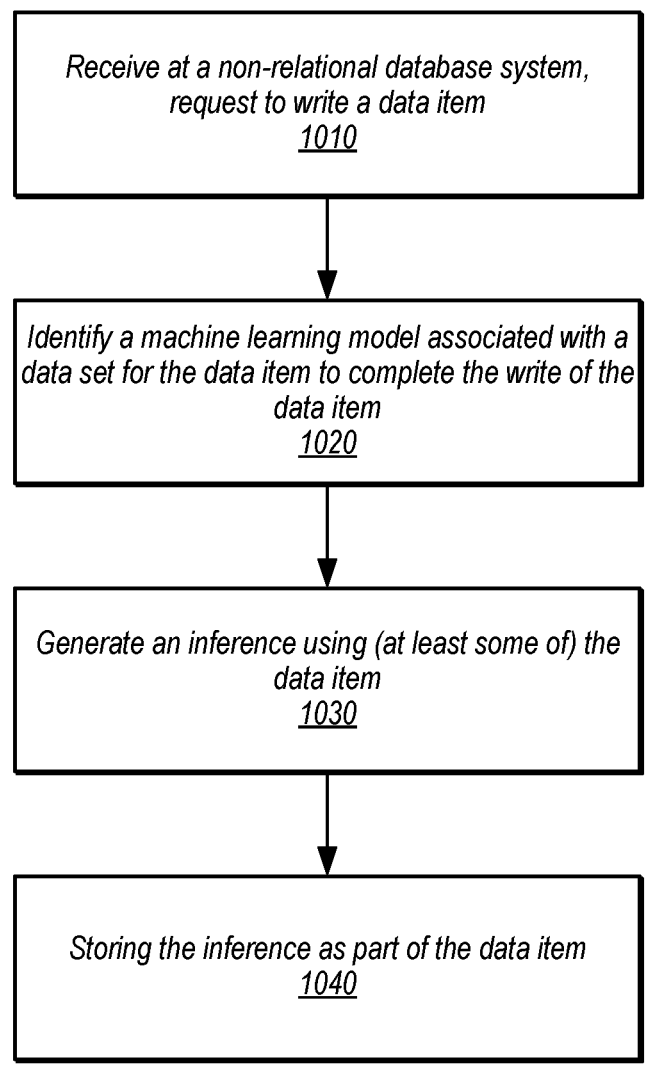
FIG. 10 is a high-level flowchart illustrating various methods and techniques to handle a write at a non-relational database system that uses an inference generated from a machine learning model, according to some embodiments.

As discussed above, writes may be another type of access request. FIG. 10 is a high-level flowchart illustrating various methods and techniques to handle a write at a non-relational database system that uses an inference generated from a machine learning model, according to some embodiments. As indicated at 1010, a request to write a data item may be received at a non-relational database system, in some embodiments. In some embodiments, the write may be specified according to a query language, similar to the query languages discussed above. In some embodiments, the write may be specified according to an API. A write may be a request to add or otherwise insert a new data item or a write may be a request to update an existing data item. a As indicated at 1020, a machine learning model associated with a data set for the data item may be identified, the machine learning model being used to complete the write of the data item, in some embodiments. For example, metadata or other information descriptive of a data set of items (e.g., a table, collection, etc.) may specify the machine learning model to be used on writes (another machine learning model could be specified for other access requests), in some embodiments. In some embodiments, the write request may identify, reference, or otherwise invoke the machine learning model to use for the write.

As indicated at 1030, an inference may be generated using (at least some) of the data item, in some embodiments. For example, as discussed above, attribute values (which may be specified in the write request) may be used as input features for generating the inference, in some embodiments. As indicated at 1040, the inference may be stored as part of the data item, in some embodiments. For example, the inference may be stored as an new/additional field or attribute of the data item. In some embodiments, the inference may overwrite an existing value (e.g., a default value) of an attribute of the data item.

Figure 11:
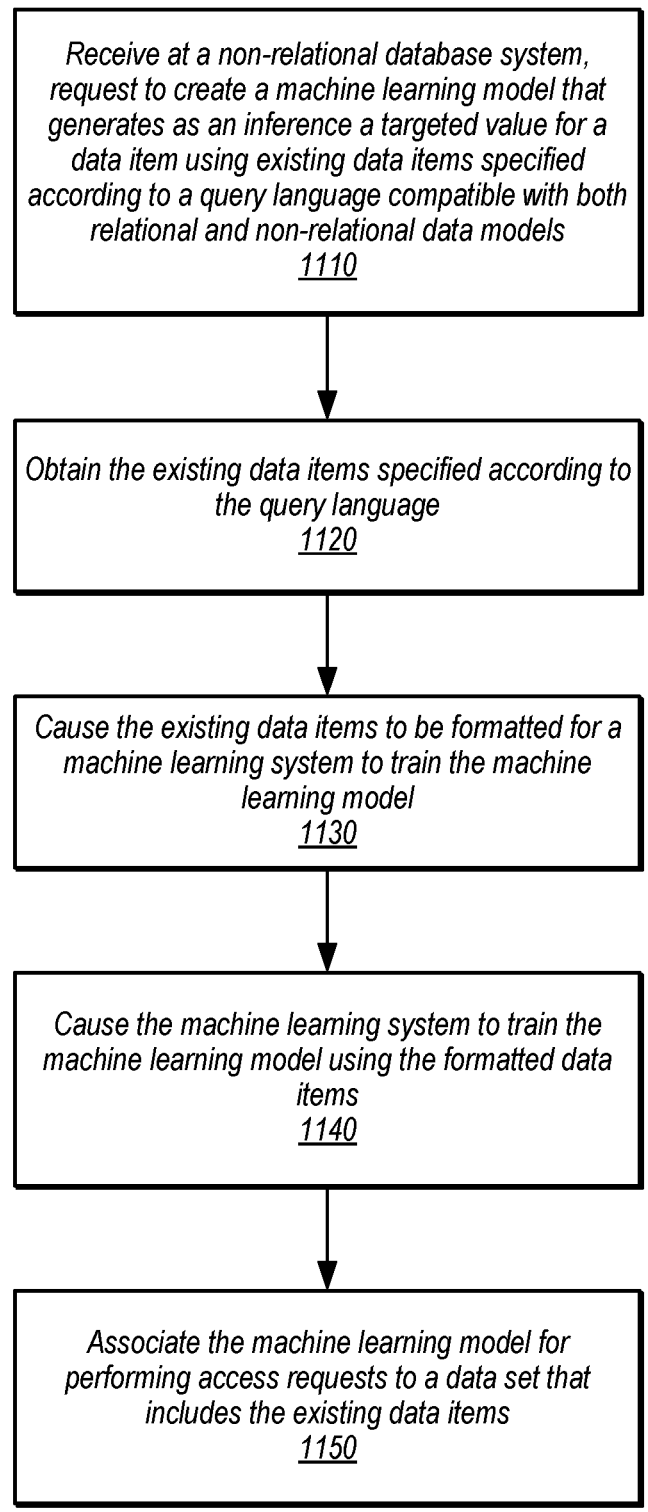
FIG. 11 is a high-level flowchart illustrating various methods and techniques to create a machine learning model for handling queries at a non-relational database system, according to some embodiments.

As discussed above, in some scenarios machine learning models may be trained or created independent of the data in the non-relational database (e.g., a service provided model trained using other data). However, it may be desirable to train and deploy machine learning models using data from the non-relational database system, such as data items from a particular table, collection, or other data set. FIG. 11 is a high-level flowchart illustrating various methods and techniques to create a machine learning model for handling queries at a non-relational database system, according to some embodiments.

As indicated at 1110, a request to create a machine learning model that generates an inference as a targeted value for a data item using existing data items specified according to a query language compatible with both relational and non-relational data models may be received, in some embodiments. An example of such a request is described below:
CREATE MODEL demo_ml.customer_churn
FROM (
  SELECT c.age, c.zip, c.monthly_spend, c.monthly_cases, c.active
  FROM customer_info_table c
)
TARGET c.active;

As indicated at 1120, the existing data items may be obtained as specified according to the query language, in some embodiments. For example, a query statement may be executed, like the select statement in the above example, to obtain the existing items. As indicated at 1130, the existing data items may be formatted for a machine learning system to train the machine learning model, in some embodiments. For example, one or more transformation workflows, tools, or applications may be initiated to change the obtained items from a result format (e.g., a JSON format) to a format that can be understood by a machine learning system (e.g., a CSV format). In some embodiments, the formatted items may be stored in a storage location accessible to the machine learning system (e.g., a separate storage system or service in a training object or file). a As indicated at 1140, the machine learning system may be caused to training the machine learning model using the formatted data items, in some embodiments. For example, the machine learning system may have various auto-selection features which may support identifying training techniques, hyperparameters, model tuning, feature selection, and other aspects of training a machine learning model. In some embodiments, the request to create the model may include one or more of these training parameters or features (not depicted in the example create request above). Once trained, the machine learning model may be associated with performing access requests to a data set that includes the existing data items, in some embodiments, as indicated at 1150. For example, metadata may be updated to include the association. In some embodiments, the machine learning model may be moved, copied or transmitted to a deployment location (e.g., at a request handling node of the non-relational database system or a node or endpoint hosting the machine learning model in a separate service or system).

The techniques described above with regard to FIG. 11, may be performed to periodically refresh or otherwise update the machine learning model, in some embodiments. For example, a machine learning model may be initially created in response to a request, and then periodically refreshed, such as after a threshold amount of time passes since model creation (or a last refresh) or after a threshold amount of additional data is stored in the non-relational database.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 12:
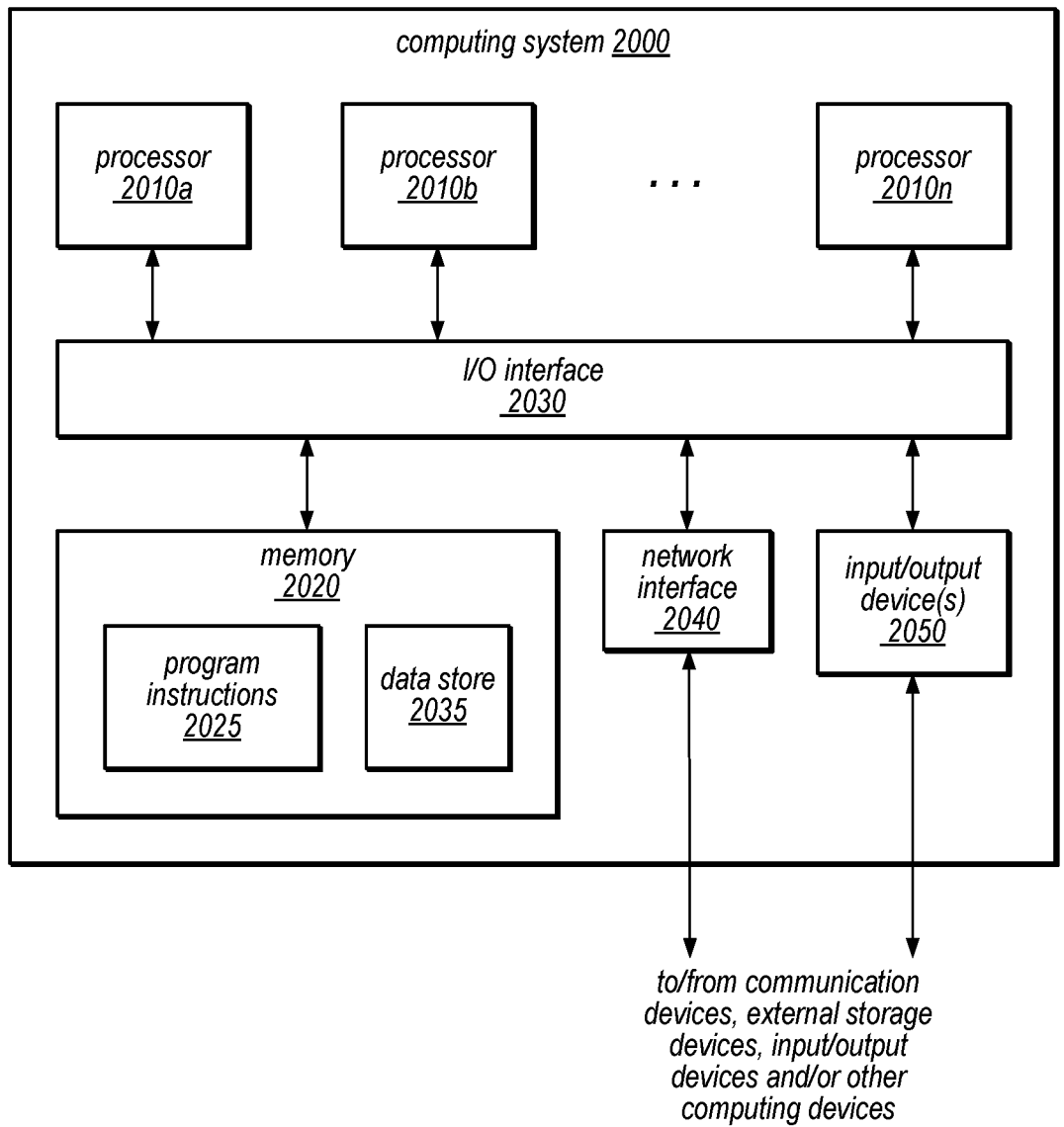
FIG. 12 is a block diagram illustrating an example computing system, according to some embodiments.

Embodiments to implement obtaining inferences to perform access requests at a non-relational database system as described herein may be executed on one or more computer systems, which may interact with various other devices. One such computer system is illustrated by FIG. 12. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions, in one embodiment. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 2020 may store program instructions 2025 and/or data accessible by processor 2010, in one embodiment. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. A computer-accessible medium may include non-transitory storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040, in one embodiment.

In one embodiment, I/O interface 2030 may be coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000, in one embodiment. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000, in one embodiment. Multiple input/output devices 2050 may be present in computer system 2000 or may be distributed on various nodes of computer system 2000, in one embodiment. In some embodiments, similar input/output devices may be separate from computer system 2000 and may interact with one or more nodes of computer system 2000 through a wired or wireless connection, such as over network interface 2040.

As shown in FIG. 12, memory 2020 may include program instructions 2025, that implement the various embodiments of the systems as described herein, and data store 2035, comprising various data accessible by program instructions 2025, in one embodiment. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 2000 may be transmitted to computer system 2000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
a memory, storing program instructions that when executed by the one or more processors, cause the one or more processors to implement a non-relational database system, the non-relational database system configured to:
receive a write request for a data item;

determine that the write request for the data item uses a machine learning model to complete the write request;

obtain one or more attribute values of the data item;

provide the one or more attribute values of the data item as input to the machine learning model to generate at least one inference to complete the write request; and store the at least one inference as a further attribute value of the data item in addition to the one or more attribute values of the data item.

2. The system of claim 1, wherein the non-relational database system is further configured to:

receive a query specified in a query language compatible with both relational and non-relational data models, wherein the query includes as part of a predicate, a further inference, and wherein the query invokes the machine learning model;

cause the further inference to be generated using at least one attribute value of a different item as input to the machine learning model invoked by the query;

evaluate the predicate of the query using the further inference to generate a result for the query; and return the result of the query in response to the query.

3. The system of claim 1, wherein the write request is a request to update an existing item.

4. The system of claim 1, wherein the non-relational database system is further configured to:

receive a request to create the machine learning model that generates the at least one inference as a targeted value for a given data item using a plurality of existing data items specified in the request to create the machine learning model according to a query language compatible with both relational and non-relational data models;

obtain the plurality of existing data items specified according to the query language;

cause the obtained plurality of existing data items to be formatted for a machine learning system to train the machine learning model; and cause the machine learning system to train the machine learning model using the formatted data items; and associate the machine learning model for performing access requests to a data set that includes the plurality of existing data items.

5. A method, comprising:

receiving, at a non-relational database system, a write request to a data item;

determining, by the non-relational database system, that the write request to the data item uses a machine learning model to complete the write request;

causing, by the non-relational database system, at least one inference to be generated using one or more attribute values of the data item as input to the machine learning model; and storing, by the non-relational database system, the at least one inference as a further attribute value of the data item in addition to the one or more attribute values of the data item.

6. The method of claim 5, further comprising:

receiving, at the non-relational database system, a query specified in a query language compatible with both relational and non-relational data models, wherein the query includes as part of a predicate, a further inference, and wherein the query invokes the machine learning model;

causing, by the non-relational database system, the further inference to be generated using at least one attribute value of a different item as input to the machine learning model invoked by the query;

evaluating, by the non-relational database system, the predicate of the query using the further inference to generate a result for the query; and returning, by the non-relational database system, the result of the query in response to the query, wherein the result includes the further inference.

7. The method of claim 6, wherein the query is received from one or more cache nodes that were unable to complete the query at a result cache and wherein a response to the query includes the at least one inference to be stored in the result cache.

8. The method of claim 5, wherein the write request is a request to add a new item.

9. The method of claim 5, wherein a replication stream that replicates writes to data set that includes the data item also replicates the inference stored as part of the data item when replicating the write.

10. The method of claim 5, further comprising:

receiving, at the non-relational database system, a request to create the machine learning model that generates the at least one inference as a targeted value for a given data item using a plurality of existing data items specified in the request to create the machine learning model according to a query language compatible with both relational and non-relational data models;

obtaining, by the non-relational database system, the plurality of existing data items specified according to the query language;

causing, by the non-relational database system, the obtained plurality of existing data items to be formatted for a machine learning system to train the machine learning model; and causing, by the non-relational database system, the machine learning system to train the machine learning model using the formatted data items; and associating, by the non-relational database system, the machine learning model for performing access requests to a data set that includes the plurality of existing data items.

11. The method of claim 5, wherein the machine learning model is deployed at a different system separate from the non-relational database system and wherein causing the at least one inference to be generated comprises sending a request to the different system to generate the at least one inference, wherein the request to the different system includes the one or more attribute values of the data item as input to the machine learning model.

12. The method of claim 5, wherein the machine learning model is trained at a different system separate from the non-relational database system and provided to a request handling node of the non-relational database system and wherein causing the at least one inference to be generated comprises generating the at least one inference at the request handling node of the non-relational database system.

13. The method of claim 5, wherein the non-relational database is a non-relational database service implemented as part of a provider network and wherein the machine learning model is implemented as part of a machine learning service implemented as part of the provider network.

14. One or more non-transitory, computer-readable storage media, storing program instructions that when executed on or across one or more computing devices cause the one or more computing devices to implement a non-relational database system that implements:

receiving a write request for a data item;

determining that the write request for the data item uses a machine learning model to perform the write request;

causing at least one inference to be generated using one or more attributed values of the data item as input to the machine learning model; and storing the at least one inference as a further attribute value of the data item in addition to the one or more attribute values of the data item.

15. The one or more non-transitory, computer-readable storage media of claim 14, storing further instructions that when executed on or across the one or more computing devices, cause the one or more computing devices to further implement:

creating or refreshing the machine learning model that generates the at least one inference as a targeted value for a given data item using a plurality of existing data items specified in the request to create the machine learning model according to a query language compatible with both relational and non-relational data models, comprising:

obtaining the plurality of existing data items specified according to the query language;

causing the obtained plurality of existing data items to be formatted for a machine learning system to train the machine learning model; and causing the machine learning system to train the machine learning model using the formatted data items; and associating the machine learning model for performing access requests to a data set that includes the plurality of existing data items.

16. The one or more non-transitory, computer-readable storage media of claim 14, wherein the machine learning model is trained using data separate from the non-relational database system.

17. The one or more non-transitory, computer-readable storage media of claim 14, wherein the machine learning model is trained at a different system separate from the non-relational database system and provided to a request handling node of the non-relational database system and wherein, in causing the at least one inference to be generated, the program instructions cause the one or more computing devices to implement generating the at least one inference at the request handling node of the non-relational database system.

18. The one or more non-transitory, computer-readable storage media of claim 14, wherein the machine learning model is deployed at a different system separate from the non-relational database system and wherein, in causing the at least one inference to be generated, the program instructions cause the one or more computing devices to implement sending a request to the different system to generate the at least one inference, wherein the request to the different system includes the one or more attribute values of the data item as input to the machine learning model.

19. The one or more non-transitory, computer-readable storage media of claim 14, wherein the write request is a request to update an existing item.

20. The one or more non-transitory, computer-readable storage media of claim 14, wherein the write request is a request to add a new data item.

* * * * *